(12) United States Patent
Smith

(10) Patent No.: US 6,781,347 B1
(45) Date of Patent: Aug. 24, 2004

(54) APPARATUS AND METHOD FOR STABILIZING A CHARGE CIRCUIT WHEN A CONNECTION BETWEEN A BATTERY CELL AND THE CHARGE CIRCUIT IS INTERRUPTED

(75) Inventor: Gregory J. Smith, Tucson, AZ (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/335,069

(22) Filed: Dec. 30, 2002

(51) Int. Cl.[7] .................. H01M 10/44; H01M 10/46
(52) U.S. Cl. .................................................. 320/122
(58) Field of Search ................................ 320/122, 127, 320/128, 132, 137, DIG. 12

(56) References Cited

U.S. PATENT DOCUMENTS 4,602,204 A * 7/1986 Hase ........................ 320/153
5,646,502 A * 7/1997 Johnson ..................... 307/66
6,351,099 B2 * 2/2002 Jones et al. ................ 320/132

* cited by examiner

*Primary Examiner*—Edward H. Tso
(74) *Attorney, Agent, or Firm*—Brett A. Hertzberg; Merchant & Gould P.C.

(57) ABSTRACT

A clamp circuit stabilizes a battery charging system when a battery is detected as being decoupled from the system and a power supply is providing current to the system. A battery detect circuit detects when the battery is decoupled from the system. A biasing circuit provides a biasing current to the clamp circuit when the battery is detected as being decoupled from the system. The clamp circuit shunts current from a battery charge terminal to maintain a stable condition in the battery charging system such that the system can withstand constant charge from the power supply without becoming damaged. The clamp circuit is deactivated when the battery is coupled to the system. The battery detect circuit includes a power management circuit that limits the power dissipated by the system.

21 Claims, 1 Drawing Sheet

APPARATUS AND METHOD FOR STABILIZING A CHARGE CIRCUIT WHEN A CONNECTION BETWEEN A BATTERY CELL AND THE CHARGE CIRCUIT IS INTERRUPTED

FIELD OF THE INVENTION

The present invention relates to a battery charging system. More particularly, the present invention relates to a clamp circuit that stabilizes a battery charging system when a battery cell is detected as being decoupled from the system.

BACKGROUND OF THE INVENTION

Rechargeable lithium based batteries, including Lithium-Ion batteries and Lithium-Polymer batteries, are used in portable applications such as cellular telephones. A Lithium battery is gradually charged by an external power supply. The Lithium battery is initially charged via a trickle current path to a low threshold voltage. The Lithium battery is then charged via a regular current path to a high threshold voltage.

SUMMARY OF THE INVENTION

The present invention discloses a clamp circuit that stabilizes a battery charging system when a battery is detected as being decoupled from the system and a power supply is providing current to the system. A battery detect circuit detects when the battery is decoupled from the system. A biasing circuit provides a biasing current to the clamp circuit when the battery is detected as being decoupled from the system. The clamp circuit shunts current from a battery charge terminal to maintain a stable condition in the battery charging system such that the system can withstand constant charge from the power supply without becoming damaged. The clamp circuit is deactivated when the battery is coupled to the system. The battery detect circuit includes a power management circuit that limits the power dissipated by the system.

In one example, the present invention is related to an apparatus for stabilizing a battery charging circuit when a battery is detected as being decoupled from the apparatus. The apparatus comprises a battery detect circuit and a clamp circuit. The battery detect circuit is arranged to detect when the battery is decoupled from the apparatus. The clamp circuit is coupled to a battery charge terminal of the apparatus. The clamp circuit is arranged to maintain a stable condition in the apparatus by shunting current from the battery charge terminal when the battery is detected as being decoupled from the apparatus.

In another example, the present invention is related to an apparatus for stabilizing a battery charging circuit when a battery is detected as being decoupled from the apparatus. The apparatus comprises a primary charge path circuit, a secondary charge path circuit, a battery detect circuit, and a clamp circuit. The primary charge path circuit is arranged to selectively couple power from a power supply to the battery when the voltage associated with the battery is above a threshold, such that the battery is selectively charged by a primary charging current. The secondary charge path circuit is arranged to couple power from the power supply to the battery when the voltage associated with the battery is below the threshold, such that the battery is selectively charged by a secondary charging current. The battery detect circuit is arranged to detect when the battery is decoupled from the apparatus. The clamp circuit is arranged to maintain the secondary charging current when the battery is detected as being decoupled from the apparatus, such that a stable condition in the apparatus is maintained.

In still another example, the present invention is related to a method of stabilizing a battery charging circuit when a battery is detected as being decoupled from a battery charge terminal. The method comprises detecting when the battery is decoupled from the battery charge terminal and shunting current from the battery charge terminal to maintain a stable condition in the battery charging circuit.

In still yet another example, the present invention is related to an apparatus for stabilizing a battery charging circuit when a battery is detected as being decoupled from a battery charge terminal. The apparatus comprises a means for detecting when the battery is decoupled from the battery charge terminal and a means for shunting current from the battery charge terminal to maintain a stable condition in the battery charging circuit.

A more complete appreciation of the present invention and its improvements can be obtained by reference to the accompanying drawing, which is briefly summarized below, to the following detailed description of illustrative embodiments of the invention, and to the appended claims.

DETAILED DESCRIPTION OF THE PREFERRED EMBODIMENT

Figure 1:
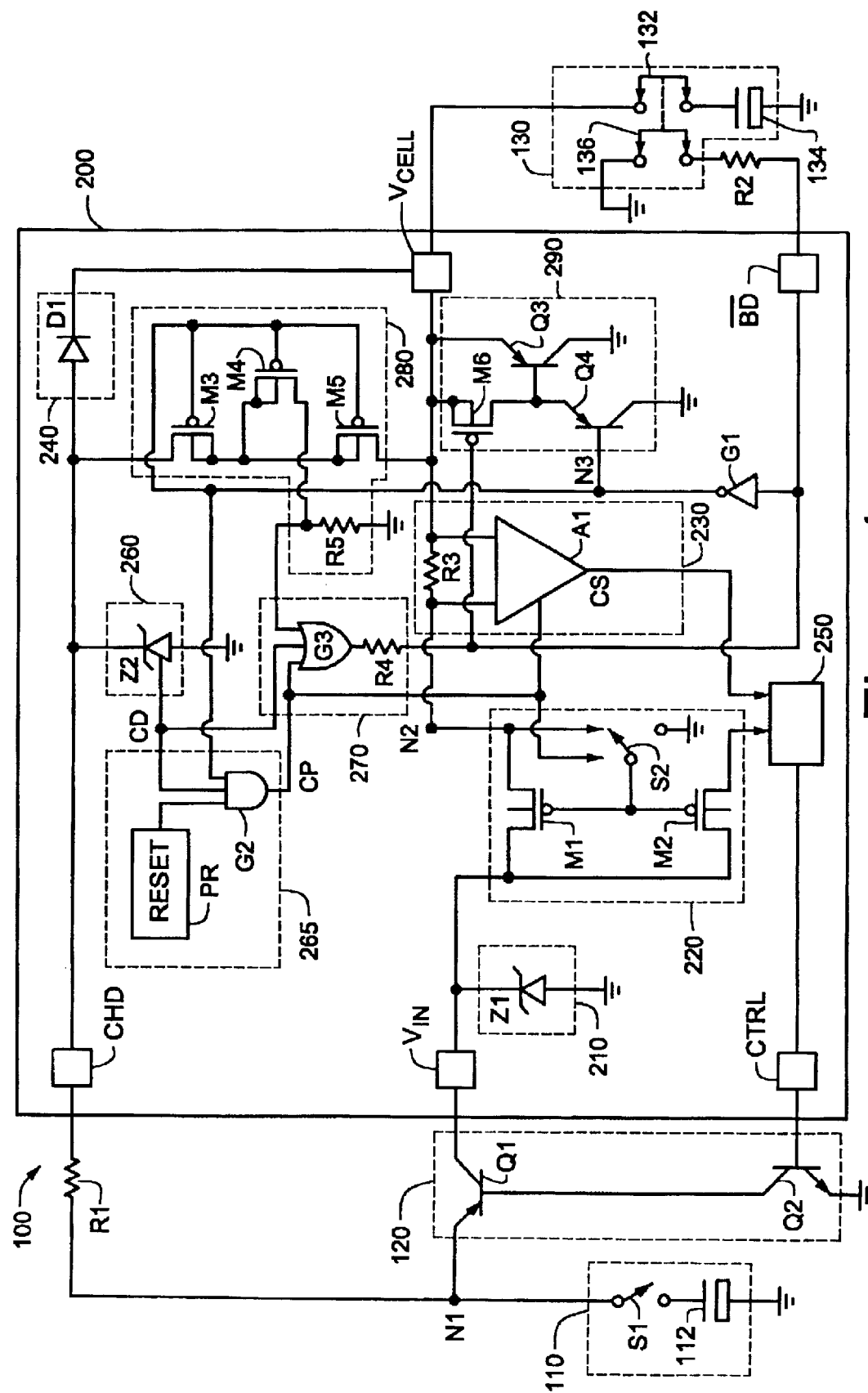
FIG. 1 is a schematic diagram of an exemplary battery charging system in accordance with the present invention

Throughout the specification, and in the claims, the term "connected" means a direct electrical connection between the things that are connected, without any intermediary devices. The term "coupled" means either a direct electrical connection between the things that are connected, or an indirect connection through one or more passive or active intermediary devices. The term "circuit" means one or more passive and/or active components that are arranged to cooperate with one another to provide a desired function. The term "signal" means at least one current signal, voltage signal or data signal. The meaning of "a", "an", and "the" include plural references. The meaning of "in" includes "in" and "on". Also, "battery" includes single cell batteries and multiple cell batteries.

FIG. 1 is a schematic diagram of an exemplary battery charging system (100) that is arranged in accordance with the present invention. The battery charging system (100) includes a charger circuit (110), two resistors (R1, R2), a current limiting circuit (120), an integrated circuit (200), and a battery pack circuit (130). The integrated circuit (200) includes five contact terminals (a charge detect terminal (CHD), an input voltage terminal ($V_{IN}$), a control terminal (CTRL), a battery charge terminal ($V_{CELL}$), and a battery detect terminal (inverse BD)), an over-charge protection circuit (210), a charge path circuit (220), a current regulator circuit (230), a trickle charge circuit (240), a control circuit (250), a voltage regulator circuit (260), a charge present circuit (265), a power management circuit (270), a latch/biasing circuit (280), a clamp circuit (290), and a logic gate (G1). It is noted that the circuit functions enclosed within dashed lines may be combined or separated and still remain within the scope and spirit of the present invention. For example, the voltage regulator circuit (260), the charge present circuit (265), the power management circuit (270), and the logic gate (G1) can be combined to form a battery detect circuit. In another example, the charge path circuit (220) can be separated into primary and secondary charge path circuits.

The charger circuit (110) includes a power supply (112) coupled to a switch (S1). The switch (S1) is coupled to node N1. The resistor (R1) is coupled between node N1 and the charge detect terminal (CHD). The current limiting circuit (120) includes two bi-polar junction transistors (Q1, Q2). The emitter of transistor Q1 is coupled to node N1. The collector of transistor Q1 is coupled to the input voltage terminal ($V_{IN}$). The base of transistor Q1 is coupled to the collector of transistor Q2. The base of transistor Q2 is coupled to the control terminal (CTRL). The emitter of transistor Q2 is coupled to ground.

The battery pack circuit (130) includes a battery contact (132), a battery cell (134), and a jumper (136). The battery contact (132) couples the battery charge terminal ($V_{CELL}$) to the battery cell (134). The jumper (136) couples the resistor (R2) to ground. The battery detect terminal (inverse BD) is coupled to ground via the resistor (R2) when the battery pack circuit (130) is attached to the battery charging system (100).

The over-charge protection circuit (210) is coupled to the input voltage terminal ($V_{IN}$). The charge path circuit (220) is coupled between the input voltage terminal ($V_{IN}$) and node N2, and provides an output signal to the control circuit (250). The current regulator circuit (230) is coupled between node N2 and the battery charge terminal ($V_{CELL}$), and outputs a control signal (CS) to the control circuit (250). The trickle charge circuit (240) is coupled between the charge detect terminal (CHD) and the battery charge terminal ($V_{CELL}$). The control circuit (250) is coupled to the control terminal (CTRL). The voltage regulator circuit (260) is coupled to the charge detect terminal (CHD). The voltage regulator circuit (260) outputs a charge detect signal (CD) to the charge present circuit (265) and the power management circuit (270). The charge present circuit (265) receives input signals from the voltage regulator circuit (260) and the logic gate (G1). The charge present circuit (265) transmits a charge present signal (CP) to the charge path circuit (220), the current regulator circuit (230), and the power management circuit (270).

The power management circuit (270) is responsive to the charge present signal (CP), the charge detect signal (CD), and feedback from the latch/biasing circuit (280). The power management circuit (270) is coupled to the battery detect terminal (inverse BD). The latch/biasing circuit (280) is coupled between the charge detect terminal (CHD) and the battery charge terminal ($V_{CELL}$). The latch/biasing circuit (280) is responsive to an output signal from logic gate G1. The clamp circuit (290) is coupled between the battery charge terminal ($V_{CELL}$) and ground. The clamp circuit (290) is responsive to the output signal from the logic gate (G1) and a control signal from the battery detect terminal (inverse BD). The logic gate (G1) is coupled between the battery detect terminal (inverse BD) and node N3.

The charger circuit (110) acts as a power source to provide energy to charge the battery cell (134). The current limiting circuit (120) is arranged to selectively couple energy from the charger circuit (110) to the charge path circuit (220). Resistor R1 is arranged to couple energy from the charger circuit (110) to the trickle charge circuit (240).

The charge path circuit (220) may be configured as a diode/mirror including two p-type field effect transistors (M1, M2) and a switch (S2). The sources of transistors M1, M2 are coupled to the input voltage terminal ($V_{IN}$). The drain of transistor M1 is coupled to node N2. The gates of transistors M1, M2 are coupled together. The drain of transistor M2 provides an output signal to the control circuit (250). The switch (S2) is coupled to the gate of transistor M1. The switch (S2) is responsive to the charge present signal (CP). The switch (S2) couples the gates of transistors M1, M2 to ground when the battery charging system (100) is in a normal charge operating mode. The switch (S2) couples the gates of transistors M1, M2 to node N2 when the battery charging system (100) is in a low-charge operating mode.

The battery charging system (100) includes three possible conduction paths from the charger circuit (110) to the battery cell (134). The current limiting circuit (120) and the charge path circuit (220) provide a primary conduction path from the charger circuit (110) to the battery cell (134) when the battery charging system (100) is in the normal charge operating mode (i.e., the switch (S2) couples the gates of transistors M1, M2 to ground and the transistor (M1) behaves like a conducting switch.) The current limiting circuit (120) and the charge path circuit (220) provide a secondary conduction path from the battery charger circuit (110) to the battery cell (134) when the battery charging system (100) is in the low-charge operating mode, i.e., the switch (S2) couples the gates of transistors M1, M2 to node N2 and the transistor (M1) behaves like a MOS diode. The resistor (R1) and the trickle charge circuit (240) provide a tertiary conduction path from the charger circuit (110) to the battery cell (134) when the battery charging system (100) is in a very low-charge operating mode.

The battery charging system (100) is in the normal charge operating mode when the battery cell (134) has a potential that is above a high threshold. The battery charging system (100) is in the low-charge operating mode when the battery cell (134) has a potential that is below the high threshold and above a low threshold. The battery charging system (100) is in the very low-charge operating mode when the battery cell (134) has a potential that is below the low threshold. In one example, the high threshold corresponds to a battery cell voltage of 2 volts and the low threshold corresponds to a battery cell voltage of 1 volt.

During the normal charge operating mode, the charge path circuit (220) provides a charging current to the battery cell (134) through the primary conduction path. The over-charge protection circuit (210) may be configured to operate as a shunt regulator that is similar in operation to a zener diode (Z1). For example, zener diode Z1 rated at 4.4 volts causes current to flow from the charger circuit (110) to the battery cell (134) until the battery cell (134) is charged to 4.4 volts. Once the battery cell (134) is charged to 4.4 volts the over-charge protection circuit (210) shunts current from the input voltage terminal ($V_{IN}$) to ground so that no current flows through the charge path circuit (220).

The battery charging system (100) operates in the low-charge operating mode when the potential at the battery charge terminal ($V_{CELL}$) is between the low and high thresholds. During the low-charge operating mode, the charge path circuit (220) provides a charging current to the battery cell (140) through the secondary conduction path. Transistor M1 is forward biased when the potential at the input voltage terminal ($V_{IN}$) is greater than the potential at the battery charge terminal ($V_{CELL}$) by a diode voltage associated with transistor M1. The charge path circuit (220) supplies a current of approximately 30 mA to the battery charge terminal ($V_{CELL}$) as long as the switch (S1) remains closed. Transistor M2 detects when transistor M1 is conducting and delivers a signal to the control circuit (250). The control circuit (250) responds to the signal from transistor M2 such that the current limiting circuit (120) regulates the current through the secondary charge path to a current limit, e.g., 30 mA.

The battery charging system (100) operates in the very low-charge operating mode when the potential at the battery charge terminal ($V_{CELL}$) is less than the low threshold. During the very low-charge operating mode, the trickle charge circuit (240) provides a weak charging current to the battery cell (140). The trickle charge circuit (240) can be configured to operate similar to a diode (D1). Diode D1 limits the potential at the charge detect terminal (CHD) to approximately 0.7 volts above the potential at the battery charge terminal ($V_{CELL}$) when active. Diode D1 is active until the voltage regulator circuit (260) activates, i.e., when the potential at the battery charge terminal ($V_{CELL}$) reaches 2 volts. The potential at the charge detect terminal (CHD) equals the potential at the battery charge terminal ($V_{CELL}$) when the voltage regulator circuit (260) is active. The weak current provided through the tertiary conduction path prevents the charge detect terminal (CHD) from becoming damaged due to excessive voltage from the charger circuit (110).

The current regulator circuit (230) comprises a resistor (R3) and an amplifier (A1). The resistor (R3) is coupled between node N2 and the battery charge terminal ($V_{CELL}$). Inputs to the amplifier (A1) are coupled to node N2 and the battery charge terminal ($V_{CELL}$). The amplifier (A1) is enabled by the charge present signal (CP). Current flows through the resistor (R3) when a charge path is established between the input voltage terminal ($V_{IN}$) and the battery charge terminal ($V_{CELL}$). The amplifier (A1) senses the current drawn through the resistor (R3) and outputs the control signal (CS) to the control circuit (250). The control circuit (250) responds to the control signal (CS) such that the current limiting circuit (120) regulates the current through the charge path circuit (220).

The voltage regulator circuit (260) can be represented as a zener diode (Z2). The zener diode (Z2) regulates the potential at the charge detect terminal (CRD) when the potential at the charge detect terminal (CHD) is greater than a threshold (e.g., 2 volts). The charge detect signal (CD) generated by the voltage regulator circuit (260) is output to the charge present circuit (265) and the power management circuit (270) when the zener diode (Z2) is activated.

The charge present circuit (265) can be represented by a power-on reset (PR) and a logic gate (G2). The logic gate (G2) can be configured by an AND gate receiving as inputs the charge detect signal (CD), an output of the power-on reset (PR), and the output signal from the logic gate (G1). The power-on reset (PR) is at a high logic state when the potential at the battery charge terminal ($V_{CELL}$) is greater than the high threshold (e.g., 2 volts). The charge present signal (CP) is generated at the output of the logic gate (G2). The charge present signal (CP) is at a high logic state when the voltage regulator circuit (260) is active, the power-on reset (PR) is at a high logic state, and the output signal from the logic gate (G1) is at a high logic state. The high logic charge present signal (CP) activates the switch (S2) such that the battery charging system (100) is in the normal charge operating mode. The battery charging system (100) remains in the normal charge operating mode until the voltage at the battery charge terminal ($V_{CELL}$) falls below the high threshold.

The battery cell contact (132) couples the battery cell (134) to the battery charging system (100). The battery detect terminal (inverse BD) floats with respect to ground when the battery cell (134) is decoupled from the battery charging system (100). The power management circuit (270) defines the potential associated with the battery detect terminal (inverse BD). Logic gate G1, illustrated in FIG. 1 as an inverter, inverts the signal at the battery detect terminal (inverse BD) to drive the latch/biasing circuit (280).

Excessive voltage damage to the battery charging system (100) can occur when the battery cell (134) is decoupled from the battery charging system (100) and the charger circuit (110) is supplying current to the battery charge terminal ($V_{CELL}$). The battery cell (134) may be detected as being decoupled from the battery charging system (100) when the battery cell (134) is not present, the battery cell (134) is disconnected, the battery cell (134) is not properly connected, an open circuit exists in the battery charging system (100), or any time an open circuit exists between the battery cell (134) and the battery charging system (100). The battery detect terminal (inverse BD) is at a high logic state when the battery cell (134) is decoupled from the battery charging system (100) and a power supply (112) is applied. The battery charging system (100) establishes a charge path through the charge path circuit (220) to increase the potential at the battery charge terminal ($V_{CELL}$). As discussed above, the over-charge protection circuit (210) prevents the charger circuit (110) from increasing the potential at the battery charge terminal ($V_{CELL}$) above a threshold. Activation of the over-charge protection circuit (210) is undesirable for shunting current flowing into the charge path circuit (220) when the battery cell (134) is decoupled from the battery charging system (100) because a full compliance current will flow from the charger circuit (110) into the over-charge protection circuit (210). A high current flowing into the over-charge protection circuit (210) would be an unnecessary high power dissipating mode of operation.

The battery charging system (100) is likely to become unstable and oscillatory when the battery cell (134) is not connected to the battery charging system (100) and the charger circuit (110) is providing current to the charge path circuit (220) In one example of oscillatory behavior of the battery charging system (100), the battery cell (134) is decoupled from the battery charging system (100) and the potential at the battery charge terminal ($V_{CELL}$) is initially zero. The transistor (Q1) of the current limiting circuit (120) is deactivated because the charge path circuit (220) and the current regulator circuit (230) are inactive. The trickle charge circuit (240) increases the potential at the battery charge terminal ($V_{CELL}$). The voltage regulator circuit (260) activates and shunts current away from the trickle charge circuit (240) when the voltage at the battery charge terminal ($V_{CELL}$) is greater than the high threshold (e.g., 2 volts). The switch (S2) activates and couples the gate of transistor (M1) to ground when the battery charge terminal ($V_{CELL}$) is charged beyond the high threshold. The control circuit (250) disables charge regulation of the battery charging system (100) in response to the zero value output signal from transistor M2 of the charge path circuit (220).

Activation of the voltage regulator circuit (260) generates a high logic charge detect signal (CD). The output signal of the power management circuit (270) is at a high logic state when the voltage regulator circuit (260) is activated. A low logic output signal of the logic gate (G1) prevents the charge present signal (CP) from reaching a high logic state. The low logic charge present signal (CP) eliminates any charge paths from the charger circuit (110) to the battery charge terminal ($V_{CELL}$). The potential at the battery charge terminal ($V_{CELL}$) will dissipate below the high threshold and the battery charging system (100) will enter the low-charge operating mode. The trickle charge circuit (240) reactivates to increase the potential at the battery charge terminal ($V_{CELL}$) above the high threshold. The battery charging system (100) continues to oscillate between the normal and low-charge operating modes.

The potential at the battery charge terminal ($V_{CELL}$) would be very high before activation of either the voltage regulator circuit (260) or the switch (S2) if the over-charge protection circuit (210) did not activate in response to the increased potential at the battery charge terminal ($V_{CELL}$). Oscillation between the normal and low-charge operating modes and activation of the over-charge protection circuit (210) is unnecessary. The potential at the battery charge terminal ($V_{CELL}$) can be stabilized at a value such that the charging current is low enough to not be overly dissipative yet high enough to supply the quiescent current of the integrated circuit (200).

The present invention discloses a clamp circuit that limits the potential at the battery charge terminal ($V_{CELL}$) to approximately 1.4 volts when the battery cell (134) is decoupled from the battery charging system (100) and the charger circuit (110) is providing current. In accordance with one aspect of the present invention, the battery detect terminal (inverse BD) detects when the battery cell (134) is not connected to the battery charging system (100). The clamp circuit (290) is activated to limit the potential at the battery charge terminal ($V_{CELL}$) to less than 2 volts. The battery charging system (100) operates in the low-charge operating mode without oscillating between the normal and low-charge operating modes. The present invention prevents unstable operation of the battery charging system (100) due to the cyclical activation of unnecessary circuitry. The present invention allows the battery charging system (100) to withstand constant charge from the charger circuit (110) without becoming damaged due to thermal stress, fatigue, excessive voltage, etc.

The power management circuit (270) can be configured to operate as a logic gate (G3) and a resistor (R4). Resistor R4 is coupled between the output of the logic gate (G3) and the battery detect terminal (inverse BD). The power management circuit (270) holds the battery detect terminal (inverse BD) at a high logic state when the charger circuit (110) is activated. The power management circuit (270) does not maintain the battery detect signal (inverse BD) at a high logic state when the charger circuit (110) is not activated to avoid unnecessary drain on the battery cell (134) via resistors R2, R4.

The logic gate (G3), represented in FIG. 1 by an OR gate, receives as inputs the charge detect signal (CD), the charge present signal (CP), and feedback from the latch/biasing circuit (280). The charge detect signal (CD) activates the logic gate (G3) when the power supply (112) is present, i.e., the potential at node N1 is greater than the potential at the battery charge terminal ($V_{CELL}$). The charge present signal (CP) activates the logic gate (G3) when the potential at the battery charge terminal ($V_{CELL}$) is greater than 2 volts, i.e., the battery cell (134) is attached to the battery charging system (100). Feedback from the latch/biasing circuit (280) activates the logic gate (G3) when the latch/biasing circuit (280) is activated. The feedback ensures that the battery detect terminal (inverse BD) remains at a high logic state when the battery charging system (100) is operating in the low-charge operating mode (i.e., the potential at the battery charge terminal ($V_{CELL}$) is between 1 and 2 volts).

The latch/biasing circuit (280) can be configured by three body-connected p-type field effect transistors (M3, M4, M5) and a resistor (R5). The gates of the transistors (M3, M4, M5) are coupled to node N3. The source of transistor M3 is coupled to the charge detect terminal (CHD). The drain of transistor M3 is coupled to the sources of transistors M4, M5. The drain of transistor M4 is coupled to an input of the logic gate (G3). The resistor (R5) is coupled to the drain of transistor M4. The drain of transistor M5 is coupled to the battery charge terminal ($V_{CELL}$).

The transistors (M3, M5) couple the charge detect terminal (CHD) to the battery charge terminal ($V_{CELL}$). Activation of transistors M3, M5 provides a bias current to the clamp circuit (290) such that the clamp circuit (290) is always activated. The clamp circuit (290) holds the battery charge terminal ($V_{CELL}$) at a potential below the high threshold to prevent the battery charging system (100) from entering the normal charge operating mode. The clamp circuit (290) prevents other circuits of the battery charging system (100) from being activated. The body connections of transistors M3, M5 minimize any leakage currents generated by parasitic diodes of the transistor substrate.

The transistor (M4) transmits positive feedback to the logic gate (G3) to latch the output of the logic gate (G3) at a high logic level when the battery cell (134) is absent from the battery charging system (100). The charge detect signal (CD) and the charge present signal (CP) may not maintain a high logic level at the output of the logic gate (G3) when the battery charging system (100) is in the low-charge operating mode. The positive feedback ensures a high logic level output from the power management circuit (270) to stabilize the operation of the battery charging system (100). The high logic level output from the power management circuit (270) ensures that the latch/biasing circuit (280) is activated when the battery charging system (100) is in the low-charge operating mode. Leakage currents generated by the transistor substrate are minimized by the body connections of the transistors (M3, M4).

The clamp circuit (290) can be configured by two bi-polar junction transistors (Q3, Q4) arranged to operate as a darlington clamp. The clamp circuit (290) also includes a body-connected p-type field effect transistor (M6). The emitter of transistor Q3 is coupled to the battery charge terminal ($V_{CELL}$). The collectors of transistors Q3, Q4 are coupled to ground. The base of transistor Q3 is coupled to the emitter of transistor Q4. The base of transistor Q4 is coupled to node N3. The gate of transistor M6 is coupled to the battery detect terminal (inverse BD). The source of transistor M6 is coupled to the battery charge terminal ($V_{CELL}$). The drain of transistor M6 is coupled to the base of transistor Q3.

The clamp circuit (290) maintains the potential at the battery charge terminal ($V_{CELL}$) at a clamp voltage (e.g., 1.4 volts) when the battery cell (134) is decoupled from the battery charging system (100). The clamp circuit (290) absorbs a clamp current (e.g., 30 mA) without allowing the potential at the battery charge terminal ($V_{CELL}$) to increase above the high threshold. The clamp circuit (290) is activated by the output signal from the logic gate (G1) to clamp the battery charge terminal ($V_{CELL}$) at the clamp voltage. Transistor M6 ensures that transistors Q3, Q4 are deactivated when the battery cell (134) is coupled to the battery charging system (100) such that any leakage currents are minimized.

The above specification, examples and data provide a complete description of the manufacture and use of the composition of the invention. Since many embodiments of the invention can be made without departing from the spirit and scope of the invention, the invention resides in the claims hereinafter appended.

I claim:

1. An apparatus for stabilizing a battery charging circuit when a battery is detected as being decoupled from the apparatus, comprising:
   a battery detect circuit that is arranged to detect when the battery is decoupled from the apparatus; and
   a clamp circuit coupled to a battery charge terminal of the apparatus, wherein the clamp circuit is arranged to provide a stable low charge current by shunting current from the battery charge terminal when the battery is detected as being decoupled from the apparatus.

2. The apparatus of claim 1, wherein the battery detect circuit is coupled to a battery detect terminal of the apparatus.

3. The apparatus of claim 1, wherein the battery detect circuit activates the clamp circuit when the battery is detected as being decoupled from the apparatus.

4. The apparatus of claim 1, wherein the battery detect circuit is further arranged to detect when the battery is coupled to the apparatus.

5. The apparatus of claim 4, wherein the battery detect circuit deactivates the clamp circuit when die battery detect circuit detects that the battery is coupled to the apparatus.

6. The apparatus of claim 1, wherein the battery detect circuit further comprises a power management circuit that is arranged to limit the power dissipated by the apparatus.

7. An apparatus for stabilizing a battery charging circuit when a battery is detected a being decoupled from the apparatus, comprising:
   a battery detect circuit that is arranged to detect when the battery is decoupled from the apparatus;
   clamp circuit coupled to a battery charge terminal of the apparatus, wherein the clamp circuit is arranged to provide a stable low charge current by shunting current from the battery charge terminal when the battery is detected as being decoupled from the apparatus;
   a power management circuit that is arranged to limit the power dissipated by the apparatus; and
   a latch circuit that is arranged to activate the power management circuit when the power supply is detected as being coupled to the apparatus.

8. An apparatus for stabilizing a battery charging circuit when a battery is detected as being decoupled from the apparatus, comprising:
   a battery detect circuit that is arranged to detect when the battery is decoupled from the apparatus;
   a clamp circuit coupled to a battery charge terminal of the apparatus, wherein the clamp circuit is arranged to provide a stable low charge current by shunting current from the battery charge terminal when the battery is detected as being decoupled from the apparatus; and
   a power management circuit that is arranged to limit the power dissipated by the apparatus, wherein the power management circuit is activated when the battery is coupled to the apparatus.

9. An apparatus for stabilizing a battery charging circuit when a battery is detected as being decoupled from the apparatus, comprising:
   a battery detect circuit that is arranged to detect when the battery is decoupled from the apparatus;
   a clamp circuit coupled to a battery charge terminal of the apparatus, wherein the clamp circuit is arranged to provide a stable low charge current by shunting current from the battery charge terminal when the battery is detected as being decoupled from the apparatus; and
   a biasing circuit that is arranged to provide a biasing current to the clamp circuit when the battery is detected as being decoupled from the apparatus.

10. An apparatus for stabilizing a battery charging circuit when a battery is detected as being decoupled from the apparatus, comprising:
    a primary charge path circuit that is arranged to selectively couple power from a power supply to the battery when the voltage associated with the battery is above a threshold, such that the battery is selectively charged by a primary charging current;
    a secondary charge path circuit that is arranged to couple power from the power supply to the battery when the voltage associated with the battery is below the threshold, such that the battery is selectively charged by a secondary charging current;
    a battery detect circuit that is arranged to detect when the battery is decoupled from the apparatus; and
    a clamp circuit that is arranged to maintain the secondary charging current when the battery is detected as being decoupled from the apparatus, such that a stable condition in the apparatus is maintained.

11. The apparatus of claim 10, wherein the battery detect circuit activates the clamp circuit when the battery is detected as being decoupled from the apparatus.

12. The apparatus of claim 10, wherein the battery detect circuit is further arranged to detect when the battery is coupled to the apparatus.

13. The apparatus of claim 12, wherein the battery detect circuit deactivates the clamp circuit when the battery detect circuit detects that the battery is coupled to the apparatus.

14. The apparatus of claim 10, wherein the battery detect circuit further comprises a power management circuit that is arranged to limit the power dissipated by the apparatus.

15. The apparatus of claim 14 further comprising a latch circuit that is arranged to activate the power management circuit when the power supply is detected as being present.

16. The apparatus of claim 14, wherein the power management circuit is activated when the battery is coupled to the apparatus.

17. The apparatus of claim 14, wherein the power management circuit is activated when the battery is being charged by the secondary charging current.

18. The apparatus of claim 10 further comprising a biasing circuit arranged to provide a biasing current to the clamp circuit when the battery is detected as being decoupled from the apparatus.

19. The apparatus of claim 10, wherein the primary charge path circuit and the secondary charge path circuit can be combined to form a singular charge path circuit.

20. A method of stabilizing a battery charging circuit when a battery is detected as being decoupled from a battery charge terminal, comprising:
    detecting when the battery is decoupled from the battery charge terminal; and
    shunting current from the battery charge terminal to maintain a stable condition in the battery charging circuit.

21. An apparatus for stabilizing a battery charging circuit when a battery is detected as being decoupled from a battery charge terminal, comprising:
    a means for detecting when the battery is decoupled from the battery charge terminal; and
    a means for shunting current from the battery charge terminal to maintain a stable condition in the battery charging circuit.

* * * * *

UNITED STATES PATENT AND TRADEMARK OFFICE
CERTIFICATE OF CORRECTION

PATENT NO. : 6,781,347 B1
DATED : August 24, 2004
INVENTOR(S) : Gregory J. Smith It is certified that error appears in the above-identified patent and that said Letters Patent is hereby corrected as shown below:

Column 5,
Line 41, "terminal (CRD)" should read -- terminal (CHD) --.

Colum 9,
Line 23, "when die battery" should read -- when the battery --
Line 29, "detected a being" should read -- detected as being --.

Signed and Sealed this

Eleventh Day of January, 2005

JON W. DUDAS
*Director of the United States Patent and Trademark Office*